United States Patent
Gormley et al.

(10) Patent No.: US 10,187,789 B2
(45) Date of Patent: Jan. 22, 2019

(54) METHOD AND SYSTEM FOR CELL IDENTIFIER OPTIMIZATION

(71) Applicant: Nokia Solutions and Networks OY, Espoo (FI)

(72) Inventors: Eamonn Gormley, Bothell, WA (US); Christina Francis, Bothell, WA (US); Anthony Wong, Bothell, WA (US); Stephan McLaughlin, Bothell, WA (US); Jungnam Yun, Bothell, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/561,495

(22) PCT Filed: Mar. 25, 2016

(86) PCT No.: PCT/US2016/024374
§ 371 (c)(1),
(2) Date: Sep. 25, 2017

(87) PCT Pub. No.: WO2016/154604
PCT Pub. Date: Sep. 29, 2016

(65) Prior Publication Data
US 2018/0063757 A1 Mar. 1, 2018

Related U.S. Application Data

(60) Provisional application No. 62/138,158, filed on Mar. 25, 2015.

(51) Int. Cl.
*H04W 8/26* (2009.01)
*H04J 11/00* (2006.01)
(Continued)

(52) U.S. Cl.
CPC .......... *H04W 8/26* (2013.01); *H04W 24/02* (2013.01); *H04W 36/0061* (2013.01); *H04W 88/08* (2013.01); *H04J 11/0069* (2013.01)

(58) Field of Classification Search
CPC ....... H04W 8/26; H04W 24/02; H04W 88/08; H04J 11/0069
See application file for complete search history.

(56) References Cited

U.S. PATENT DOCUMENTS

| 2011/0021205 A1 | 1/2011 | Horneman et al. |
| 2011/0145311 A1 | 6/2011 | Jin et al. |
(Continued)

FOREIGN PATENT DOCUMENTS

| WO | WO2014086394 | 6/2014 |
| WO | WO2014086397 | 6/2014 |
(Continued)

OTHER PUBLICATIONS

International Search Report for PCT/US2016/024374 filed on Mar. 25, 2016.

*Primary Examiner* — Kevin C. Harper

(57) ABSTRACT

A method for a cellular telecommunications network includes performing a modulo operation on a physical cell identifier (PCI) of a target cell to determine a first PCI mod value, determining first tier neighbors of the target cell, determining that at least one of the first tier neighbors uses a PCI that has a PCI mod value that is the same as the first PCI mod value, comparing a number of handover attempts between the target cell and the at least one first tier neighbor with the first PCI mod value to a first threshold value, and when the number of handover attempts exceeds the threshold value, replacing the PCI of the target cell with a PCI with a second PCI mod value different from the first PCI mod value.

20 Claims, 11 Drawing Sheets

(51) Int. Cl.
*H04W 24/02* (2009.01)
*H04W 36/00* (2009.01)
*H04W 88/08* (2009.01)

(56) References Cited

U.S. PATENT DOCUMENTS

2012/0093105 A1    4/2012   Park et al.
2013/0337794 A1*   12/2013   Kojima ................ H04W 24/02
                                                                            455/418
2014/0378144 A1   12/2014   Legg et al.
2015/0079990 A1    3/2015   Yun et al.

FOREIGN PATENT DOCUMENTS

WO    WO2014169945    10/2014
WO    WO2016049592     3/2016

* cited by examiner

METHOD AND SYSTEM FOR CELL IDENTIFIER OPTIMIZATION

CROSS-REFERENCES TO RELATED APPLICATIONS

The present disclosure is a U.S. National Stage of Application No. PCT/US2016/024374 filed Mar. 25, 2016, which claims priority to U.S. Provisional Application No. 62/138,158, filed Mar. 25, 2015, which are incorporated by reference herein for all purposes.

FIELD OF TECHNOLOGY

The present disclosure relates to cellular telecommunications technology, and more specifically to resolving issues related to Physical Cell Identifiers (PCIs) in a cellular telecommunications system.

BACKGROUND

Wireless networks rely on a large number of individual cells to provide high capacity wireless services over large coverage areas such as market areas (e.g. cities), surrounding residential areas (e.g. suburbs, counties), highway corridors and rural areas. Continuous radio connectivity across these large coverage areas is accomplished via user mobility from one base station to others as the user traverses the network's operating area. High reliability mobility is an important aspect of mobile wireless networks in order to minimize the number of dropped calls or other abnormal discontinuation of radio service to the supported users.

A key feature of modern multi-base station mobility networks is the creation and maintenance of neighbor lists for each base station within the network. Each base station transmits its list of nearby neighbor cells to mobile devices such that a mobile device can continuously monitor the radio frequencies defined in the list and search for higher quality base stations to which it may handover if and when the mobile device experiences degraded signal quality from its current serving radio base station. In other words, during active call sessions, the mobile device continually monitors quality of its serving base station and scans the frequency and/or scrambling code combinations defined on its current neighbor list searching for suitable quality handover candidates.

If the mobile device finds a higher quality signal coming from a defined neighboring base station during this scanning procedure, it initiates a handover request to the network. If the request is granted, the mobile device connects to the candidate base station in either a hard or soft handover mode depending on the particular radio network technology in question. If the original serving base station's signal quality drops below a defined signal quality threshold, the mobile device will be connected entirely to the new base station and the call will continue. Should the serving base station's signal quality degrade below an acceptable level prior to the mobile device scanning and locating a suitable high quality neighboring cell, the call will typically fail and the user will experience a disconnect from the system such as a dropped call.

Each base station maintains its own list of likely neighbor cells and communicates this list via over the air messaging to each mobile station within its coverage area. Mobile stations search this list repeatedly and frequently to support handover operations as described above. Automatic Neighbor Relationship (ANR) management functions can assist with the creation and maintenance of these neighbor lists.

In Long Term Evolution (LTE) and Long Term Evolution Advanced (LTE-A) networks, User Equipment (UE) can identify LTE cells based on the Physical Cell Identifier (PCI) that is included in the Primary Synchronization Signals (PSS) and Secondary Synchronization Signals (SSS) transmitted by base stations. The UE use the PCI in the SSS and PSS in order to identify particular base stations on the UE's neighbor list.

A PCI is identified by decoding the PSS and SSS and adding the values together. The SSS may be encoded with 168 PCI values, while the PSS may encoded with three values. Adding these two signals together yields a total of 504 PCIs. Because the number of PCIs is limited, PCIs are reused throughout a network.

In addition, operators may maintain a separate set of reserved PCIs, which can be used for small cells, testing, and other purposes. The reserved PCIs are not used for normal macrocell base stations, so the existence of reserved PCIs further limits the number of PCIs that are available in LTE networks.

Due to the limited number of PCIs in a given network, conflicts occur. UE must distinguish between different base stations for connection, synchronization and mobility purposes, but reuse of the same PCIs may lead UE to confuse cells that use that use the same PCI. When synchronization signals are sent at the same time, such as in Time Division Duplexing (TDD) systems, the signals may interfere, making it difficult for UE to properly decode a PCI.

Although proper planning can avoid many PCI issues, proper planning is not always followed. Cells may be added or have identifiers changed in manual process without using a planning tool, resulting in suboptimal PCI reuse. In addition, ANR processes may incorrectly identify cells as neighbors under some circumstances. Accordingly, cellular systems can benefit from technology that identifies and resolves PCI confusion, collisions and conflicts.

BRIEF SUMMARY

Embodiments of the present disclosure are directed to detecting and resolving one or more of a PCI mod 3 conflict, a PCI mod 6 conflict, and a PCI mod 30 conflict. In an embodiment, a method for a cellular telecommunications network includes performing a modulo operation on a physical cell identifier (PCI) of a target cell to determine a first PCI mod value, determining first tier neighbors of the target cell, determining that at least one of the first tier neighbors uses a PCI that has a PCI mod value that is the same as the first PCI mod value, comparing a number of handover attempts between the target cell and the at least one first tier neighbor with the first PCI mod value to a first threshold value, and when the number of handover attempts exceeds the threshold value, replacing the PCI of the target cell with a PCI with a second PCI mod value different from the first PCI mod value.

In an embodiment, the modulo operation is a modulo 3 operation or a modulo 6 operation. In such an embodiment, the method may further include comparing a percentage of handover attempts between the target cell and the at least one first tier neighbor with the first PCI mod value to a second threshold value, wherein the PCI of the target cell is only replaced when the a percentage of handovers exceeds the second threshold value. In an embodiment, replacing the PCI of the target cell is performed by re-arranging the PCI of the target cell and PCI values for co-sited neighbor cells that use the same technology.

An embodiment may include comparing the first PCI mod value to PCI mod values of the co-sited neighbor cells, and when the first PCI mod value is different from the PCI mod values of the co-sited neighbor cells, replacing the PCI of the target cell by re-arranging the PCI of the target cell and the PCI values for co-sited neighbor cells that use the same technology.

An embodiment may include testing the re-arranged PCI values by gathering handover data from the cells with the re-arranged PCI values for a predetermined time, and analyzing the handover data to determine whether a problematic PCI conflict is present. An embodiment may further include re-arranging the PCI values of the co-sited cells into a new combination when a problematic PCI conflict is determined to be present.

An embodiment may include In an embodiment, the PCI values of the co-sited cells are re-arranged until a combination is found that is not associated with a problematic conflict, and if no combination is found that is not associated with a problematic conflict, the PCI of the target cell is replaced with a PCI that is not used by any of the co-sited cells.

In an embodiment, the modulo operation is a modulo 30 operation. In such an embodiment, the method may further include comparing a level of physical resource block (PRB) usage of the target cell to a third threshold value, wherein the PCI of the target cell is only replaced when the percentage of PRB usage exceeds the third threshold value.

DETAILED DESCRIPTION

Figure 1:
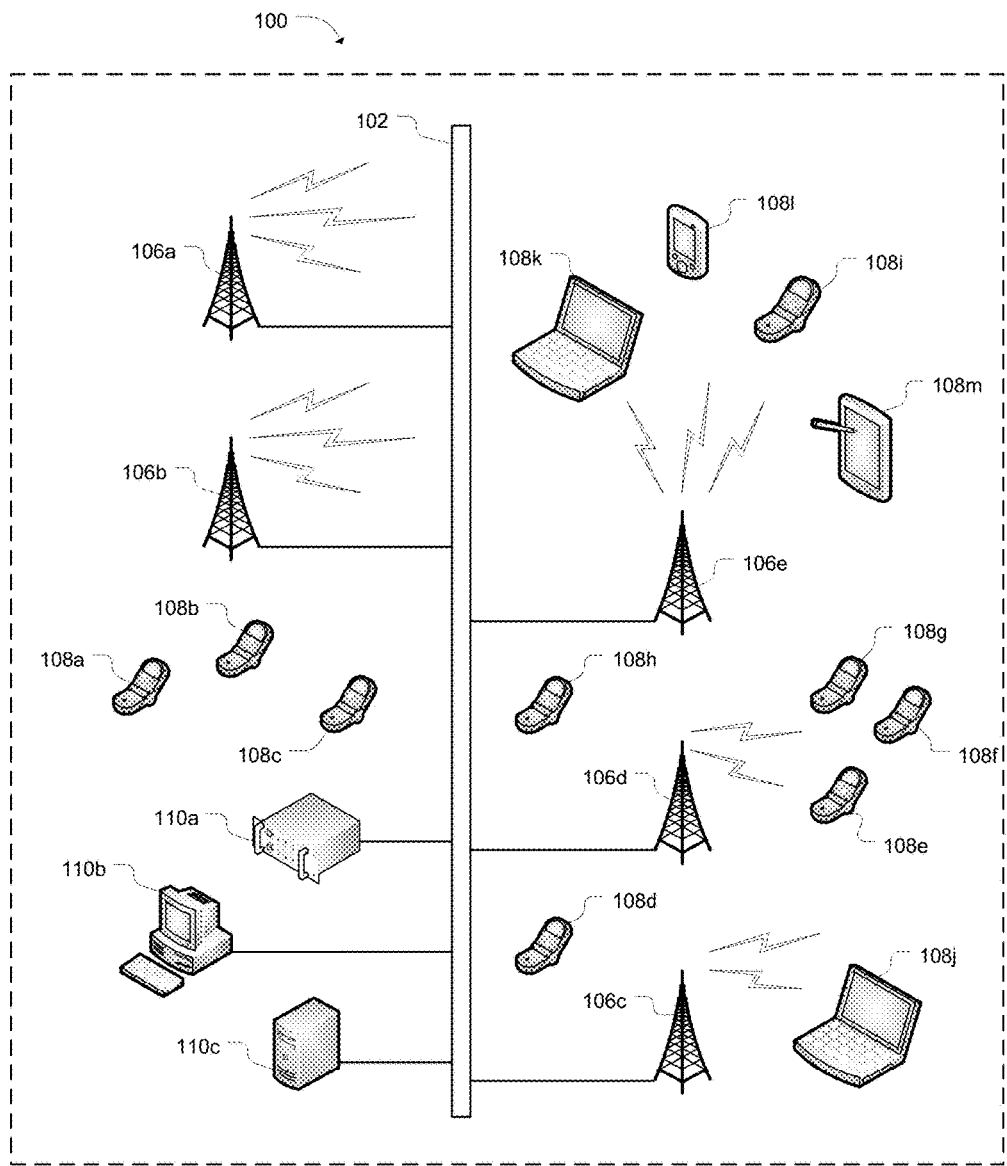
FIG. 1 illustrates an embodiment of a telecommunications network.

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

Elements of this disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of this disclosure.

Embodiments of the present disclosure relate to optimizing a cellular telecommunications network. Even when cellular identifiers are well distributed when a network is initially deployed, changing conditions may result in confusion or collision between identifiers. The network can be improved by changing non-unique cellular identifiers or altering neighbor relations to resolve the confusion or collisions.

In accordance with an embodiment of the present disclosure, FIG. 1 illustrates a networked computing system 100 including various wired and wireless computing devices that may be utilized to implement the identifier optimization processes associated with various embodiments.

A networked computing system 100 may include a group of service provider controller devices 110a-c, any of which may be Network Resource Controllers (NRCs) or have NRC functionality; network base stations 106a-e, any of which may be NRCs or have NRC functionality, that may share overlapping wireless coverage with one or more neighboring base stations within a particular region of the networked computing system 100; multiple UE including: cell phone/PDA devices 108a-i, laptop/netbook computers 108a-b, handheld gaming units 108l, electronic book devices or tablet PCs 108m, and any other type of common portable wireless computing device that may be provided with wireless communications service by any of the network base stations 106a-e; and a backhaul portion that can facilitate distributed network communications between any of the network controller devices 110a-c and any of the network base stations 106a-e.

As would be understood by those skilled in the Art, in most digital communications networks, the backhaul portion 102 of a data communications network may include intermediate links between a backbone of the network which are generally wireline, and sub networks or network base stations 106a-e located at the periphery of the network. For example, cellular user equipment communicating with one or more network base stations 106a-e may constitute a local sub network. The network connection between any of the network base stations 106a-e and the rest of the world may initiate with a link to the backhaul portion of an access provider's communications network (e.g., via a point of presence).

A Network Resource Controller (NRC) is a physical entity that may include software components. An NRC may facilitate all or part of the identifier optimization processes associated with various embodiments of the present disclosure. In accordance with an embodiment, an NRC that performs a particular process may be a physical device, such as a network controller device 110a-c or a network base station 106a-e. In yet another embodiment, an NRC that performs a particular process may be a logical software-based entity that can be stored in the volatile or non-volatile memory or memories, or more generally in a non-transitory computer readable medium, of a physical device such as a network controller device 110a-c, or a network base station 106a-e.

In accordance with various embodiments of the present disclosure, the NRC has presence and functionality that may be defined by the processes it is capable of carrying out. Accordingly, entity that is the NRC may be generally defined by its role in performing processes associated with this disclosure. Therefore, depending on the particular embodiment, the NRC entity may be considered to be either a physical device, and/or a software component that is stored in the computer readable media such as volatile or non-volatile memories of one or more communicating device(s) within a networked computing system 100. In an embodiment, any of the service provider controller devices 110a-c, and/or network base stations 106a-e (optionally having NRC functionality or considered to be a NRC) may function independently or collaboratively to implement processes associated with various embodiments of the present disclosure.

In accordance with a standard GSM network, any of the service provider controller devices 110a-c (NRC devices or other devices optionally having NRC functionality) may be associated with a base station controller (BSC), a mobile switching center (MSC), or any other common service provider control device known in the art, such as a radio resource manager (RRM). In accordance with a standard UMTS network, any of the service provider controller devices 110a-c (optionally having NRC functionality) may be associated with a network resource controller (NRC), a serving GPRS support node (SGSN), or any other common service provider controller device known in the art, such as an RRM. In accordance with a standard LTE network, any of the service provider controller devices 110a-c (optionally having NRC functionality) may be associated with an eNodeB base station, a mobility management entity (MME), or any other common service provider controller device known in the art, such as an RRM.

In an embodiment, any of the service provider controller devices 110a-c, the network base stations 106a-e, as well as any of the user equipment 108 may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. In an embodiment, any of the service provider controller devices 110a-c or any of the network base stations 106a-e may employ any number of common server, desktop, laptop, and personal computing devices.

In an embodiment, any of the user equipment 108 may be associated with any combination of common mobile computing devices (e.g., laptop computers, netbook computers, tablet computers, cellular phones, PDAs, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network of FIG. 1 may employ any of the following common communications technologies: optical fiber, coaxial cable, twisted pair cable, Ethernet cable, and powerline cable, along with any other wireless communication technology known in the art. In an embodiment, any of the service provider controller devices 110a-c, the network base stations 106a-e, and user equipment 108 may include any standard computing software and hardware necessary for processing, storing, and communicating data between each other within the networked computing system 100. The computing hardware realized by any of the network computing system 100 devices may include one or more processors, volatile and non-volatile memories, user interfaces, transcoders, modems, wireline and/or wireless communications transceivers, etc.

Further, any of the networked computing system 100 devices may include one or more computer readable media encoded with a set of computer readable instructions, which when executed, can perform a portion of processes associated with various embodiments of the present disclosure. In context with various embodiments, it should be understood that wireless communications coverage associated with various data communication technologies (e.g., network base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
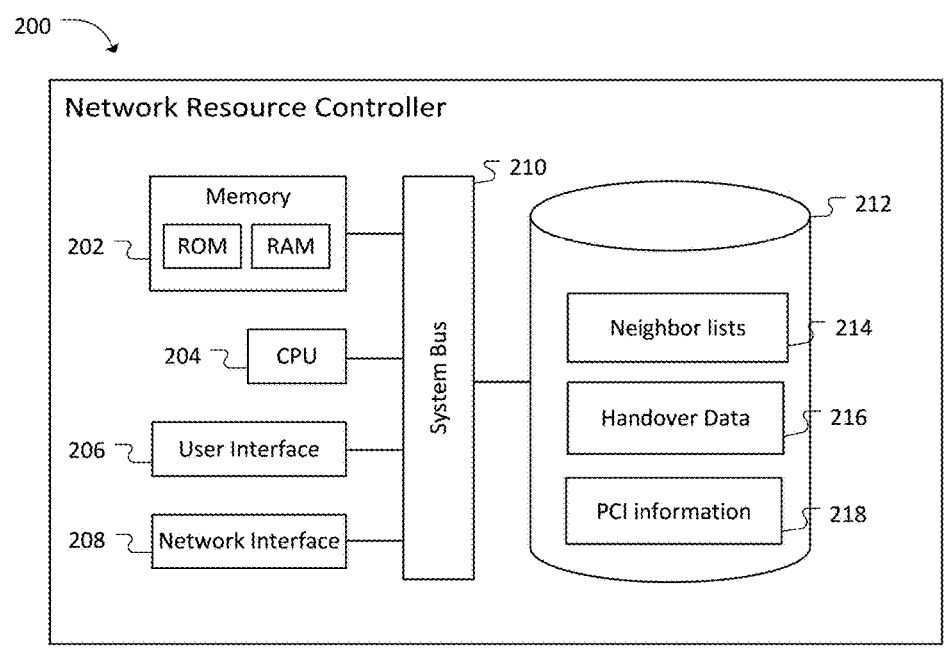
FIG. 2 illustrates an embodiment of a computer networking device.

FIG. 2 illustrates a block diagram view of an NRC 200 that may be representative of any of the network base stations 106a-e or any of the network controller devices 110a-c depicted in FIG. 1. In accordance with an embodiment of the present disclosure, the NRC 200 may be associated with any common base station or network controller device known in the Art, such as an LTE eNodeB (optionally comprising a wireless modem), RRM, MME, RNC, SGSN, BSC, MSC, etc. The NRC 200 may include one or more data processing device including a central processing unit (CPU) 204. In an embodiment, the CPU 204 may include an arithmetic logic unit (ALU, not shown) that performs arithmetic and logical operations and one or more control units (CUs, not shown) that extract instructions and stored content from memory and then execute and/or processes them, calling on the ALU when necessary during program execution. The CPU 204 may be responsible for executing all computer programs stored on the NRC's volatile (RAM) and non-volatile (e.g., ROM) system memories 202 and storage 212. Storage 212 may comprise volatile or non-volatile memory such as RAM, ROM, a solid state drive (SSD), SDRAM, or other optical, magnetic, or semiconductor memory.

The NRC 200 may also include a network interface/ optional user interface component 306 that can facilitate communication with the backhaul portion or the wireless portions of the data communications network 100 of FIG. 1, and may facilitate a user or network administrator accessing the NRC's 200 hardware and/or software resources. A storage 212 may store neighbor lists 212, handover data 216, and PCI information 218 in accordance with an embodiment of this disclosure.

Embodiments of the present disclosure relate to systems and methods that resolve issues related to cellular identifiers in a wireless telecommunications network. Although the embodiments are explained with respect to Physical Cell Identifiers (PCI) in an LTE or LTE-A cellular network, elements of this disclosure may be applied to other wireless technologies that use non-unique identifiers, such as scrambling codes (SCR) in a Universal Mobile Telecommunication System (UMTS) network.

Figure 3:
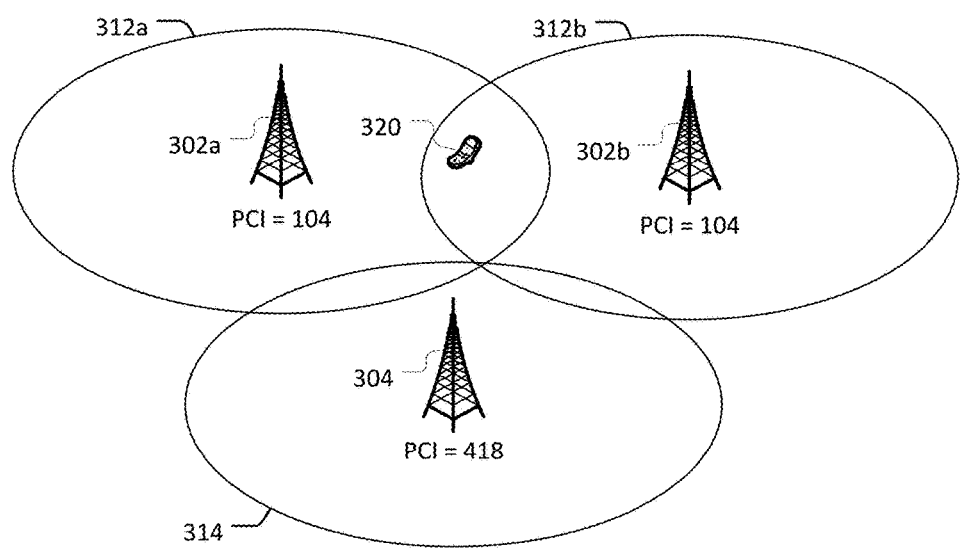
FIG. 3 shows an example of a PCI collision.

FIG. 3 shows an example of PCI collision in a wireless telecommunications network. In FIG. 3, three different base stations 302a, 302b and 304 are neighbors of one another.

Each of the base stations has a coverage area that is associated with a cell of the base station. These coverage areas are represented in FIG. 3 as coverage area 312a for base station 302a, coverage area 312b for base station 302b, and coverage area 314 for base station 304. Individual coverage areas are associated with particular cells, so this disclosure may refer to coverage areas and cells interchangeably.

Although FIG. 3 only shows one coverage area for a single cell of each base station, FIG. 3 is not a limiting representation of a cellular network. Base stations in embodiments of telecommunications networks may be macrocell base stations that provide service to multiple cells. For example, eNodeB base stations typically provide service to three different cells, each with its own respective coverage area, for a given frequency range. The base stations and cells of FIG. 3 are simplified to facilitate description of embodiments.

Coverage area 312a overlaps with coverage area 312b. Because both of the cells associated with coverage areas 312a and 312b use the same Physical Cell Identifier (PCI) and overlap one another, the cells are considered to collide with one another. In this situation, when a User equipment (UE) 320 is in the zone in which the coverage areas 312a and 312b overlap, the UE may not be able to differentiate between signals from base stations 302a and 302b, causing communications to fail.

Figure 4:
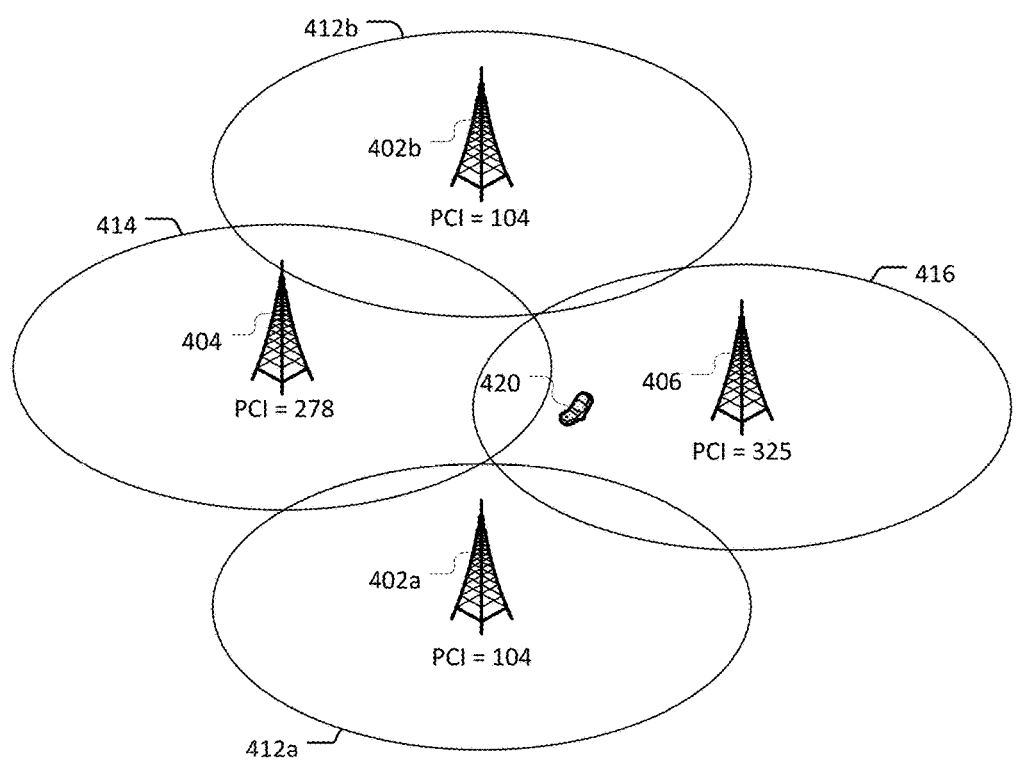
FIG. 4 shows an example of PCI confusion.

FIG. 4 shows an example of PCI confusion in a wireless telecommunications network. In FIG. 4, cell 412a is identified by the same PCI as cell 412b. However, unlike the embodiment of FIG. 3, the coverage area of cell 412a does not overlap with the coverage area of cell 412b. Rather, a user would have to traverse the coverage area of at least one of cell 414 and cell 416 in order to move from 412a to cell 412b.

In the situation of FIG. 4, UE 420 is disposed in cell 416, which is a directly adjacent neighbor cell to both of cells 412a and 412b that share the same PCI. If UE 420 moves towards base station 402a, the wireless network will attempt to hand over UE 420 from cell 416 to cell 412a.

Base station 406 maintains a list of neighboring cells that are identified, at least in part, by a PCI. In various systems, base station 406 may transmit the list of neighboring cells, or some portion of the list of neighboring cells, to UE 420. UE 420 uses the neighbor cell information received from base station 406 to determine which cell to handover to.

However, networks may use rules that prevent a given PCI from appearing more than once on a neighbor cell list. Thus, in some situations, cell 416 will have an entry for a single PCI that is shared by two of its neighbors, such as PCI 104 in the example of FIG. 4. If the neighbor cell information is particular to cell 412a, the UE 420 may use information for cell 412a to execute the handover to cell 412b, in which case the handover will fail. This situation is referred to as PCI confusion.

PCI collisions are not mutually exclusive from PCI confusion. For example, returning to the example of FIG. 3, even when a collision is present between cells 312a and 312b, a neighboring cell 316 will experience PCI confusion. Accordingly, a process that identifies confusion may also identify a collision.

Figure 5:
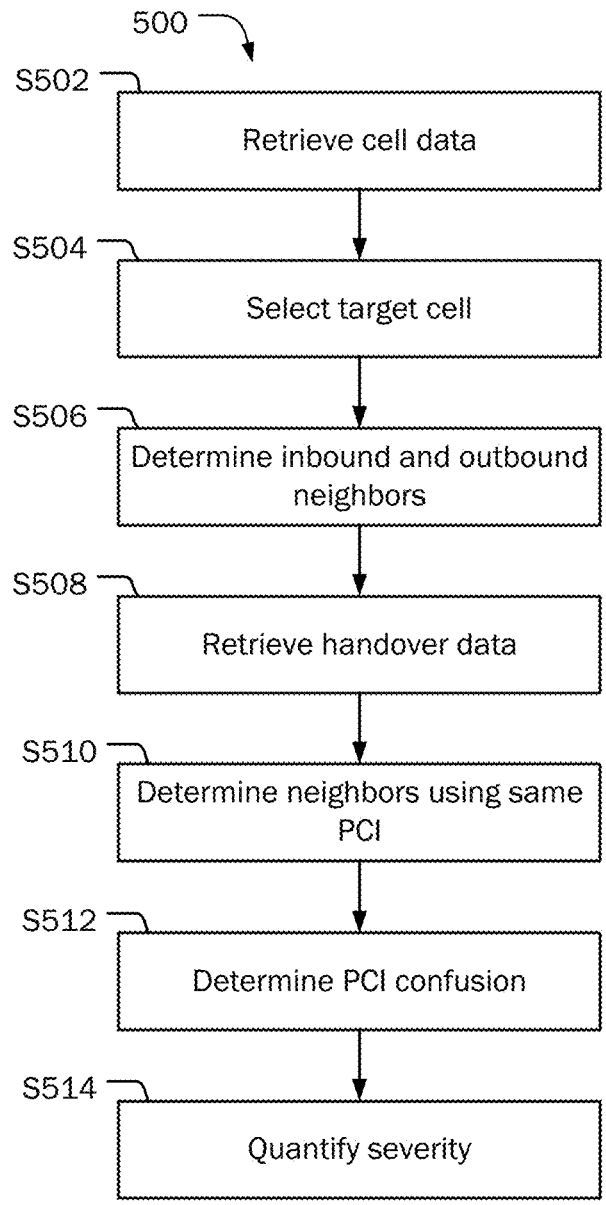
FIG. 5 illustrates an embodiment of a process for detecting PCI confusion.

FIG. 5 shows a process 500 for detecting PCI confusion and PCI collisions in a wireless communication network. In an embodiment elements of process 500 may be performed, for example, by a network resource controller 200, which may be a SON controller coupled to a backhaul portion of an LTE network.

In an embodiment, process 500 includes retrieving cell data at S502. The cell data retrieved at S502 may include neighbor relations data such as handover data and neighbor cell list information for cells in the network.

As discussed above, eNodeBs in an LTE network maintain a neighbor cell list of handover targets for mobility purposes. Thus, in an LTE network, each macrocell has a neighbor cell list associated with the cell. The neighbor lists are typically built using Automatic Neighbor Relation (ANR) processes, which may populate a neighbor list without manual entry. ANR may complete a neighbor list for a newly installed cell within a few hours of installation.

Figure 6:
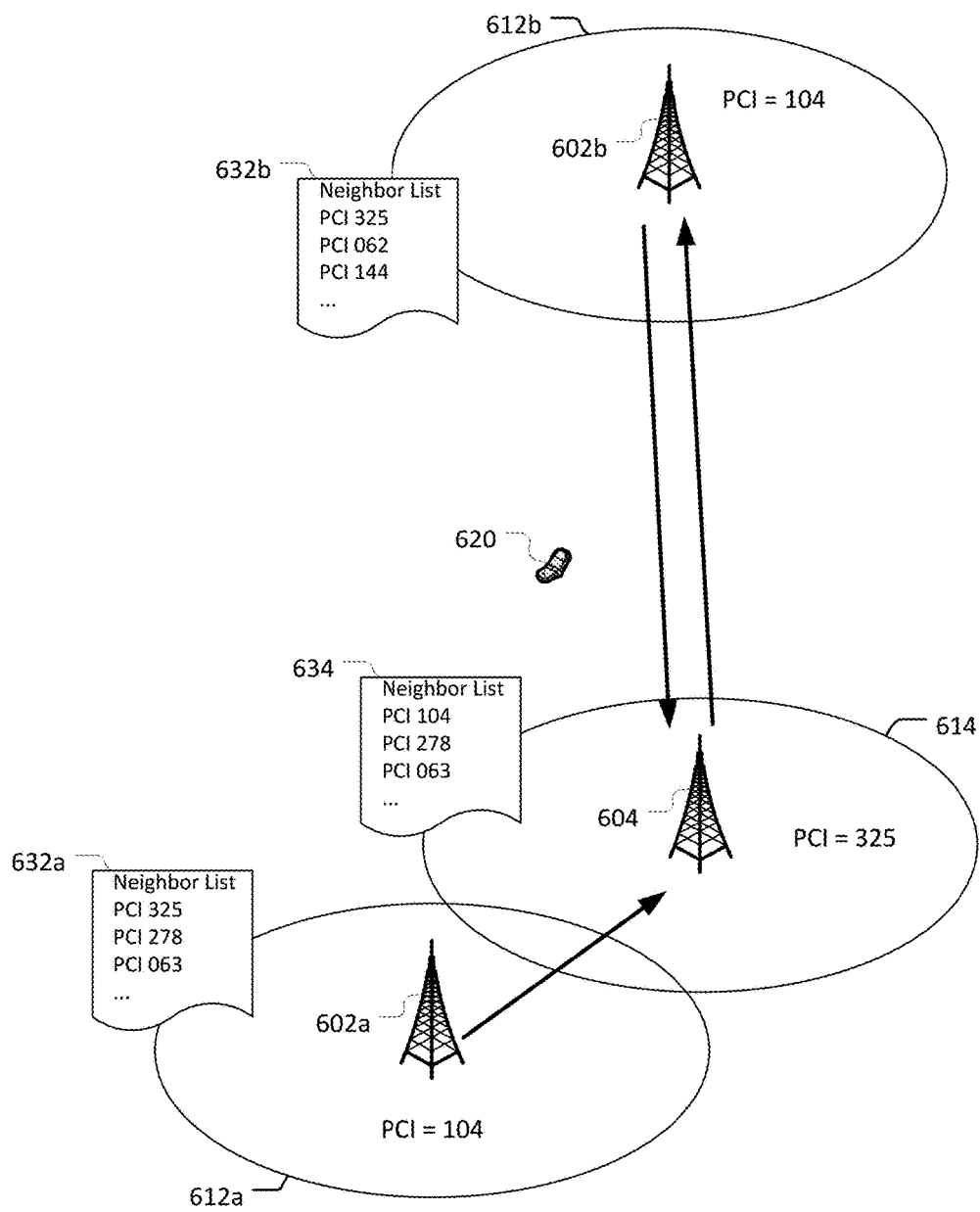
FIG. 6 illustrates an example of PCI confusion.

S502 may include retrieving all of the neighbor cell lists for a network, or for some geographically limited portion of a network. In some networks, inaccurate neighbor relationships may be present that span considerable distances. For example, FIG. 6 shows an example of PCI confusion in which an incorrect neighbor cell 612b is on a neighbor list 634 of a cell 614 even though they are separated by a considerable distance. In this situation, the neighbor relationship between cell 612b and cell 614 is characterized as incorrect because under normal circumstances, UE cannot successfully complete a handover between the two cells.

Meanwhile, cell 612a that has the same PCI as distant cell 612b is a proper mobility neighbor of cell 614. However, while information for cell 614 is on neighbor list 632a of cell 612a, information for cell 612a is not on neighbor list 634 for cell 614. This neighbor relationship situation is shown by the arrows of FIG. 6, which show that cells 614 and 612b are both inbound and outbound neighbors of one another, but cell 612a is only an inbound neighbor of cell 614 and not an outbound neighbor.

Such a situation may arise when a UE transitions directly from service with cell 612b to service with cell 614. For example, cell 612b may be separated from cell 614 by a body of water. A user in a boat could cross the body of water without passing through intervening cells, thereby transitioning between service from cell 612b to service with cell 614 without any intervening handovers. In these circumstances, ANR processes may automatically add an entry for cell 612b on the neighbor list 634 of cell 614, and add an entry for cell 614 on neighbor list 632b of cell 612b.

Subsequently, cell 612a may be added to the network using the same PCI as cell 612b. Because cells 612b and 614 are separated by a considerable distance, a PCI planning tool may assign a PCI to cell 612a without realizing that doing so creates a PCI confusion situation with cell 612b. Meanwhile, cell 612a may recognize neighbor cell 614 and add it to its neighbor list 632a. However, because the PCI for cell 612a already appears on the neighbor list 634 for cell 614, the neighbor list may not be updated to include cell 612a.

Other situations may occur that create PCI collisions or PCI confusion in a network, such as manual intervention by network operators, software failures, etc. Because PCI confusion can exist between cells that are separated by substantial distances, retrieving neighbor lists at S502 may include retrieving neighbor lists for an entire network or a large network area.

Retrieving cell data at S502 may include retrieving configuration management data from a Configuration Management (CM) server and retrieving performance management data from a Performance Management (PM) server. PCI assignments may be included in the data from the CM server, while Key Performance Indicators (KPI) such as handover metrics may be retrieved from the PM server. Cell data may be retrieved for every target cell from the Operation Support System (OSS) for a network.

A target cell is selected at S504. The target cell may be any cell whose neighbor list was retrieved at S502. In an embodiment, S504 is repeated for every cell whose neighbor list is retrieved at S502.

Inbound and outbound neighbors for the target cell are determined at S506. In an embodiment, determining outbound neighbors includes determining cells that are on the neighbor cell list of the target cell. Determining inbound neighbors may be performed by searching for the presence of the target cell on neighbor cell information for other cells of the network. For example, determining inbound neighbors may include identifying every cell that has an identifier for the target cell on its neighbor list.

However, while neighbor cell lists include outbound neighbors for a given cell, inbound neighbors are not on the list. Accordingly, techniques for identifying inbound neighbors are explained in further detail.

In an embodiment, neighbor cell lists for each cell in a network are searched to identify the presence of the target cell. Each cell that has the target cell on its respective neighbor cell list is considered an inbound neighbor of the target cell. A list of inbound neighbors may be built for every cell in a network using such a process. Outbound neighbors may be determined by examining neighbor lists of each cell, where outbound neighbors appear in the neighbor cell lists.

In another embodiment, neighbors of neighbors are searched at S506 to identify inbound and outbound neighbors of a target cell. In particular, each of the neighbor cells on the neighbor cell list for the target cell may be identified, and neighbor cell lists for those neighbors may be searched. In other words, an embodiment includes searching neighbor lists of neighbor cells on a neighbor cell list of the target cell.

Regardless of the specific elements of the process of determining inbound and outbound neighbors, a result may be classification of analyzed cells as being at least one of an inbound neighbor, an outbound neighbor, not a neighbor, or a bi-directional neighbor when a cell is both an inbound and outbound neighbor.

Retrieving handover data at S508 may include retrieving various forms of data related to handovers in the network. For example, handover data may be key performance indicators (KPI) for handover, such as handover success rates. In other embodiments, handover data may include raw handover data such as source and target cells, times, and whether attempts were successful. In an embodiment, the handover data may include handover metrics, including numbers of handover attempts between particular cells in a predetermined time period, etc.

Neighbors of the target cell that use same PCI values are identified at S510. In an embodiment, the PCI values of all inbound and outbound neighbors of the target cell are analyzed, and all cells that share the same PCI value are identified as a subset of the overall neighbor data.

In another embodiment, neighbors that share a PCI may be determined by analyzing handover data collected at S508. In an embodiment, the handover data is analyzed to identify all neighbors that attempted or successfully completed a handover to the target cell, and then all of the neighbors that handed-in to the target cell are analyzed to determine if any of them share the same PCI value. Handover information may be used in addition to neighbor cell lists to identify neighbor relationships.

PCI confusion may be determined at S512 by analyzing one or more of the inbound and outbound neighbor data determined at S506, the handover data from S508, and neighbors that share the same PCI from S510. In an embodiment, PCI confusion may be determined by identifying two cells with the same PCI value that are both inbound neighbors of the target cell, where only one of the two cells is an outbound neighbor of the target cell.

For example, turning to FIG. 6, cell 614 is an inbound neighbor of both cell 612b and 612a. However, while cell 612b is an outbound neighbor of cell 614, cell 612a is not an outbound neighbor. In other words, while cell 614 is on respective neighbor cell lists 632a and 632b of both cells 612a and 612b, only cell 612b is on the neighbor cell list 634 of cell 614.

However, embodiments are not limited to this specific scenario, and in other embodiments, PCI confusion may be present when only one of the neighbors is an inbound neighbor to the target cell. In another embodiment, PCI confusion may be present when both of the confused cells are outbound neighbors of the target cell, and neither neighbor is an inbound neighbor. Such a situation could arise, for example, when a PCI value of a cell is changed by a network operation, thereby creating confusion.

Two cells that use the same PCI and are both inbound neighbors to a target cell do not necessarily represent PCI confusion for the target cell. If neither cell is an outbound neighbor of the target cell, then network performance may not be affected. Thus, determining whether one of two inbound neighbors to a target cell that use the same PCI value is also an outbound neighbor may be performed before determining that PCI confusion exists.

The severity, or impact, of a PCI cell confusion may be quantified at S514. The severity of the confusion may be used to determine whether and how to resolve PCI confusion. For example, if a PCI confusion situation is identified by process 500 and it is determined that the confusion has no actual impact on network performance at S514, then the PCI confusion may be allowed to remain.

Quantifying the severity of PCI confusion may use handover data that was retrieved at S508. The handover data may be analyzed to determine a specific number or proportion of handover failures that are associated with the PCI confusion. For example, in the situation shown in FIG. 6, handover attempts from target cell 614 to one of the confusing cells 612a and 612b would be expected to fail. The number or proportion of handover failures in a time period may be used to create a severity metric.

Figure 7:
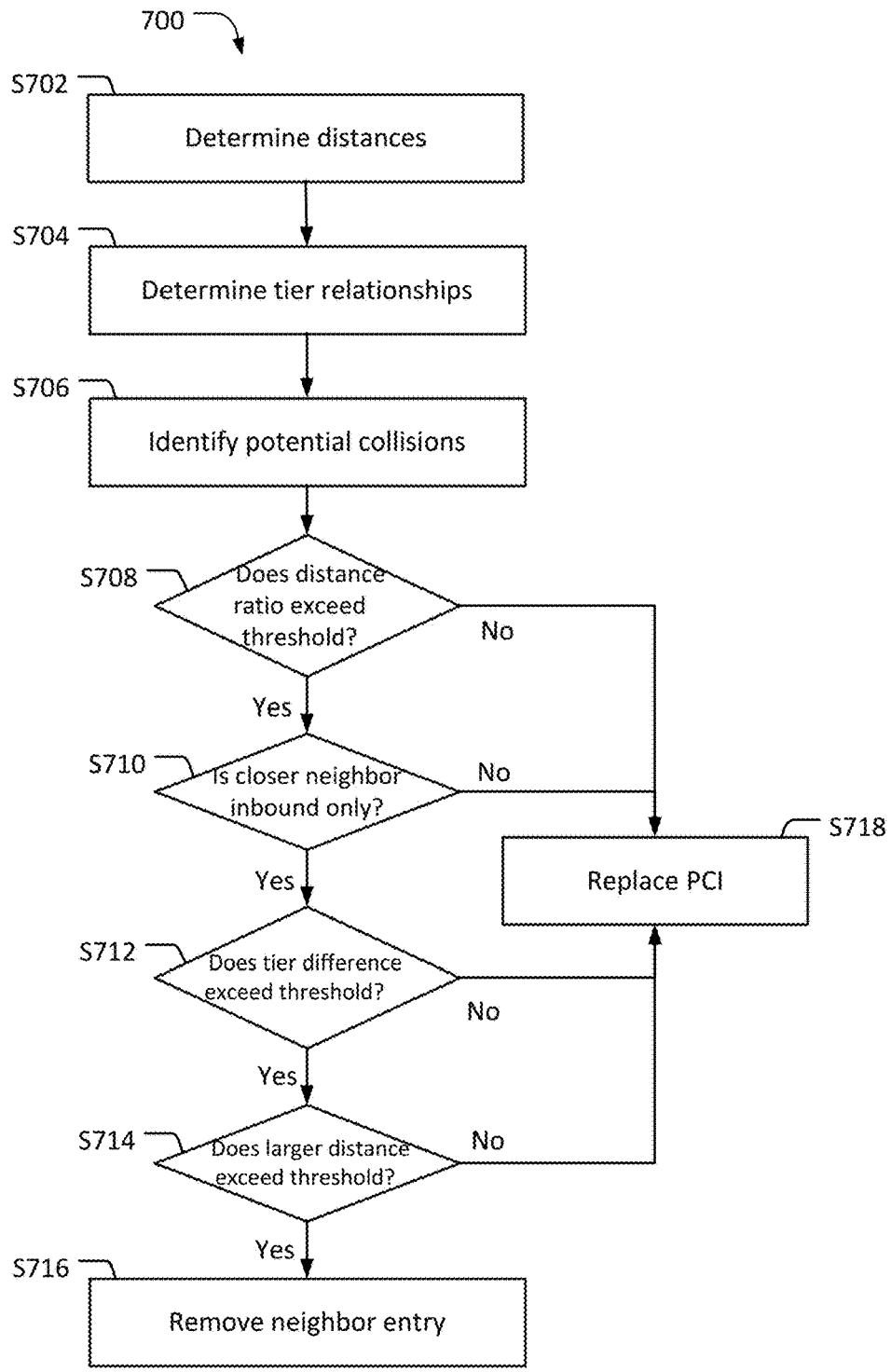
FIG. 7 illustrates an embodiment of a process for classifying and resolving PCI confusion.

FIG. 7 shows a process 700 for identifying and resolving PCI confusion or a PCI collision in a telecommunications network. Process 700 may be performed in addition to process 500 when identifying, characterizing or resolving PCI confusion or a PCI collision. FIG. 7 may be performed to further characterize or resolve the cells involved with the PCI confusion determined at S512. The two cells that share the same PCI that were determined to be involved with PCI confusion at S512 may be referred to as confusing cells in this disclosure.

Distances from the target cell to each of the confusing cells may be determined at S702. Distances may be determined by comparing geographic coordinates such as latitude and longitude, or using other available distance data. In addition, S702 may determine a distance between the confusing cells.

Tier relationships between the confusing cells, and between each of the confusing cells and the target cell, may be determined at S704. In an embodiment, the tier relationships may be determined by counting tiers using techniques described in PCT Application No. PCT/US15/52482, Method and System for Neighbor Tier Determination. In another embodiment, tiers may be determined manually. Tier relationships between the confusing cells may be determined in addition to the tier relationships between the target cell and each of the confusing cells.

Potential collisions between the confusing cells may be determined at S706. When PCI confusion is determined to be present in the network at S512, there is also a chance that a PCI collision may be present between the confusing cells. Due to policies that prevent cells from including cells that use the same PCI on their neighbor cell lists, it may not be possible to determine PCI collisions, as illustrated in FIG. 3, by simply comparing PCIs on a given cell's neighbor list to the PCI of the given cell.

Thus, when confusing cells have been identified, potential collision scenarios between the confusing cells are identified at S706. For example, a distance between the confusing cells that was determined at S702 may be compared to a threshold value, and if the distance is less than a threshold value, the confusing cells may be identified as a potential collision scenario. In an embodiment, a tier relationship from S704 is compared to a threshold value, and a potential collision scenario is identified when the tier relationship is less than the predetermined value. In such embodiments, a report may be generated that identifies potential collision scenarios that could be investigated further to determine whether a collision is actually present.

In some embodiments, if a collision is determined to be present with a high degree of probability, then the collision may be resolved by changing the PCI of one of the confusing cells at S718.

A set of factors may be considered at S708 to S714 in order to determine a resolution to the confusion. It should be appreciated that while FIG. 7 shows four different factors, other embodiments may use more or less factors. In addition, some embodiments may make determine a resolution based on some portion of a plurality of factors.

The first factor, is determining whether a ratio between distances from the target cell to the confusing cells exceeds a threshold value at S708. Specifically, with respect to the example of FIG. 6, the ratio is between a distance from target cell 614 to the farther confusing cell 612b, or a first distance D1, and a distance from the target cell 614 and the closer confusing cell 612a, or a second distance D2. In this case, S708 compares the ratio of D1:D2 to a threshold value.

The distances may be determined using latitude and longitude coordinates. The distances that are compared at S708 may be distances between base stations, or distances between cell coverage areas. For example, the distances may be distances between centroids of cell coverage areas. Although S708 uses a ratio, other embodiments may use other values. For example, and embodiment may compare a difference in distances to a threshold value.

The next factor that may be considered at S710 is whether the closer of the two confusing cells is only an inbound neighbor to the target cell. FIG. 6 shows such a scenario. In FIG. 6, the farther confusing cell S602b is both an inbound neighbor and an outbound neighbor of target cell 604. In contrast, the closer confusing cell S602a is only an inbound neighbor to target cell 604. S710 may be performed, for example, by determining whether the closer of the two confusing cells is on the neighbor list 634 of target cell 604.

Another factor is determining whether a difference in tier counts between target cell 614 and the two confusing cells 612a and 612b exceeds a threshold value at S712. S712 may include comparing the tier relationships determined at S704. For example, if the target cell 614 is separated from first confusion cell 612a by four tiers, and target cell is separated from second confusion cell 612b by fourteen tiers, S712 determines the difference in tier counts (14−4=10), and compares the difference to a threshold value.

A fourth factor to be considered is whether the larger of the two distances between the target cell 614 and the confusing cells 612a and 612b exceeds a threshold value. The larger of the distances, or D2 from the example above, is compared to a threshold value at S714.

Each of the factors in S708 to S714 relate to whether automatic neighbor relation (ANR) processes are appropriate for remedying the PCI confusion. ANR processes may be engaged to resolve the PCI confusion by removing a neighbor entry at S716.

For example, if S714 establishes that confusing neighbor 612b is a substantial distance from target cell 614, the confusing cell 612b may be removed from neighbor list 634 of target cell 614. When a handover is successfully completed between the closer confusing cell 612a and target cell 614, ANR processes may automatically establish an entry for confusing cell 612a on the neighbor list 634 of the target cell 614, thereby resolving the PCI confusion.

On the other hand, if one or more of the factors is not met, then a PCI value for one of the confusing cells may be replaced at S718. For example, if factors S708 to S714 suggest that both confusion cells 612a and 612b are similar distances to target cell 614, then removing an entry from the neighbor list 634 of the target cell is less likely to successfully resolve the PCI confusion. In such an embodiment, the PCI value for one of the confusing cells 612a and 612b is replaced at S718. The PCI value may be replaced with a value suggested by a PCI planning tool to reduce the likelihood that the new PCI value will lead to additional confusion in the network.

PCI Mod 3 and Mod 6 Conflicts

Although reuse of the same PCI value can be problematic when the cells that reuse the PCI value are in close proximity to one another or are mobility neighbors of the same cell, there are other issues related to how PCIs are distributed in a cellular telecommunications network. One such issue is a PCI mod 3 conflict.

A PCI is identified by decoding the PSS and SSS and adding the values together. UE are able to obtain physical layer identity (0 to 2) from PSS and physical layer cell identity group (0 to 167) from SSS. Then, the PCI for a given cell is determined by, PCI=3*(physical layer cell identity group)+physical layer identity.

Therefore, a mod 3 of a PCI corresponds to the physical layer identity, which is obtained from the PSS.

Because there are only three PSS values, the PSS value is frequently reused in cellular networks. Considering that cells in high density areas can have several first tier neighbors, PCI mod 3 conflicts are common in cellular networks. Accordingly, rather than eliminating all PCI mod 3 conflicts in a network, embodiments of the present disclosure identify and resolve problematic PCI mod 3 conflicts. Problematic conflicts may exist, for example, when a Cell-Specific Reference Signals (CRSs) experiences interference.

Downlink CRSs (Cell-specific Reference Signals) are used for downlink channel estimation and channel quality measurement. Downlink CRSs are transmitted in the same OFDM symbols for all PRBs (Physical Resource Blocks) in the cell, but their location in frequency domain is determined by a modulo-6 of the PCI for single antenna or a modulo-3 of the PCI for two or more antenna ports. Having the same PCI mod 3 value between adjacent cells with two or more antennas may degrade performance in channel estimation and channel quality measurement, leading to lower throughput.

Although the specific embodiments described in this disclosure are for mod 3 conflicts, persons of skill in the art will recognize that other specific embodiments may identify and resolve mod 6 conflicts using the same or similar techniques. In other words, for example, process 900 can be performed for mod 6 conflicts as well as mod 3 conflicts.

Figure 8:
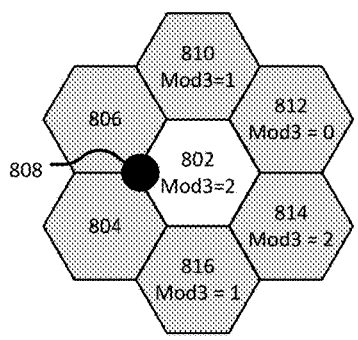
FIG. 8 illustrates a mod 3 conflict.

FIG. 8 shows an embodiment of a PCI mod 3 conflict in a wireless cellular telecommunications network. In the scenario of FIG. 8, target cell 802 is served by a base station 808, which also serves co-sited intra-frequency neighbor cells 804 and 806 that use the same technology. In addition, target cell 802 has first tier neighbors 810, 812, 814 and 816 that are served by different base stations. FIG. 8 shows a PCI mod 3 conflict between target cell 802 and first tier neighbor cell 814, both of which share the PCI mod 3 value of 2. The result of the modulo operation on a PCI value may be referred to as a PCI mod value for the PCI.

Figure 9:
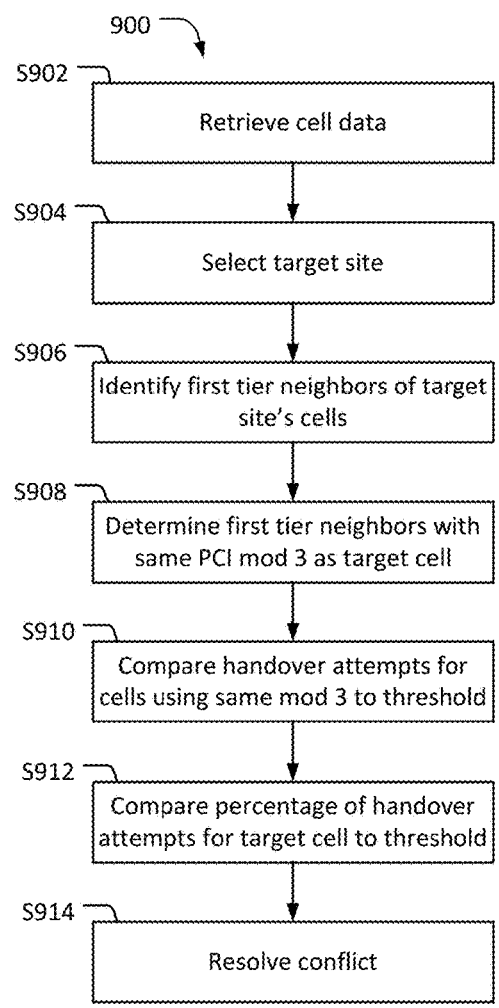
FIG. 9 illustrates an embodiment of a process for determining a problematic mod 3 or mod 6 conflict.

FIG. 9 shows an embodiment of a process 900 for identifying problematic PCI mod 3 conflicts in a cellular telecommunications network. Cell data is retrieved at S902. Retrieving cell data at S902 may include retrieving configuration management data from a Configuration Management (CM) server and retrieving performance management data from a Performance Management (PM) server. PCI assignments may be included in the data from the CM server, Key Performance Indicators (KPI) such as handover metrics may be retrieved from the PM server, and channel quality indicator (CQI) data may be included in the PM data. Cell data may be retrieved for every target cell from the Operation Support System (OSS) for a network. The data retrieved at S902 may include inbound and outbound handover data for each cell in a network.

A target site is selected at S904. The site may be a base station site that serves one or more cells. In an embodiment, every site in a network may be selected at S904, so that process 900 is performed for all cells in the network. In other embodiments, process 900 is performed on some portion of sites in the network. In another embodiment, process 900 may be performed for some portion of cells of one or more site, such as cells that use a particular technology.

First tier neighbors for each cell of the site are identified at S906. In an embodiment, a first tier neighbor is a mobility neighbor of a target cell and whose cell coverage area overlaps with or shares a cell boundary with a coverage area of the target cell. Neighbor tier relationships between cells are described, for example, in P.C.T. Application No. PCT/US15/52482. Neighbor tiers may be determined according to processes described in that document, by an RF planning tool, by a network engineer, etc.

First tier neighbors of the target cell with the same PCI mod 3 value as the target cell are determined at S908. These neighbor cells may be determined by comparing PCI mod 3 values of each cell of the target site to PCI mod 3 values of the first tier neighbors identified at S906.

An amount of handover attempts between the target cell and each first tier neighbor cell that has the same PCI mod 3 value as the target cell is compared to a threshold value at S910. In other words, handover attempts to hand out from the target cell to the neighbor cells as well as attempts to hand in from the neighbor cells to the target cell are evaluated at S910. A problematic PCI conflict is expected to be associated with a higher number of handover attempts between conflicted cells. Therefore, if the number of attempts exceeds the threshold value, then the associated cells may be designated as being involved in a problematic conflict to be resolved by changing PCI values.

A percentage of handover attempts between first tier neighbor cells that have a PCI mod 3 conflict with a cell of the target site relative to a total number of handover attempts is determined at S912 and compared to a threshold value. In particular, the percentage of handover attempts may be the percentage of all handover attempts for the target cell and its first tier neighbors. With respect to FIG. 8, the percentage of handover attempts may be the portion of handovers between target cell 802 and conflicted cell 814 compared to a sum of handovers between target cell 802 and neighbor cells 810, 812, 814 and 816.

A problematic PCI mod 3 conflict is expected to be associated with a higher percentage of handover attempts between conflicted cells compared to other first tier neighbors. Accordingly, when the percentage of handover attempts exceeds the threshold value, then the conflicted cells may be designated as being associated with a problematic conflict, and the conflict may be resolved at S914.

The PCI mod 3 conflict may be resolved at S914 by rotating the PCI values of co-sited cells or by choosing a different PCI value for one or more cells. Resolving PCI conflicts are discussed in further detail in other parts of this disclosure.

PCI Mod 30 Conflicts

In LTE systems, the uplink DMRSs (De-Modulation Reference Signals) included in a shared data channel (PUSCH) are constructed from 30 different Zadoff-Chu sequences, which are sequentially reused for PCI values. Thus, DMRSs for PCIs can be determined by performing a modulo-30 operation on a PCI. Having the same DMRS sequence between adjacent cells may result in performance degradation in uplink channel estimation and channel quality measurement, leading to lower throughput.

Figures 10, 11:
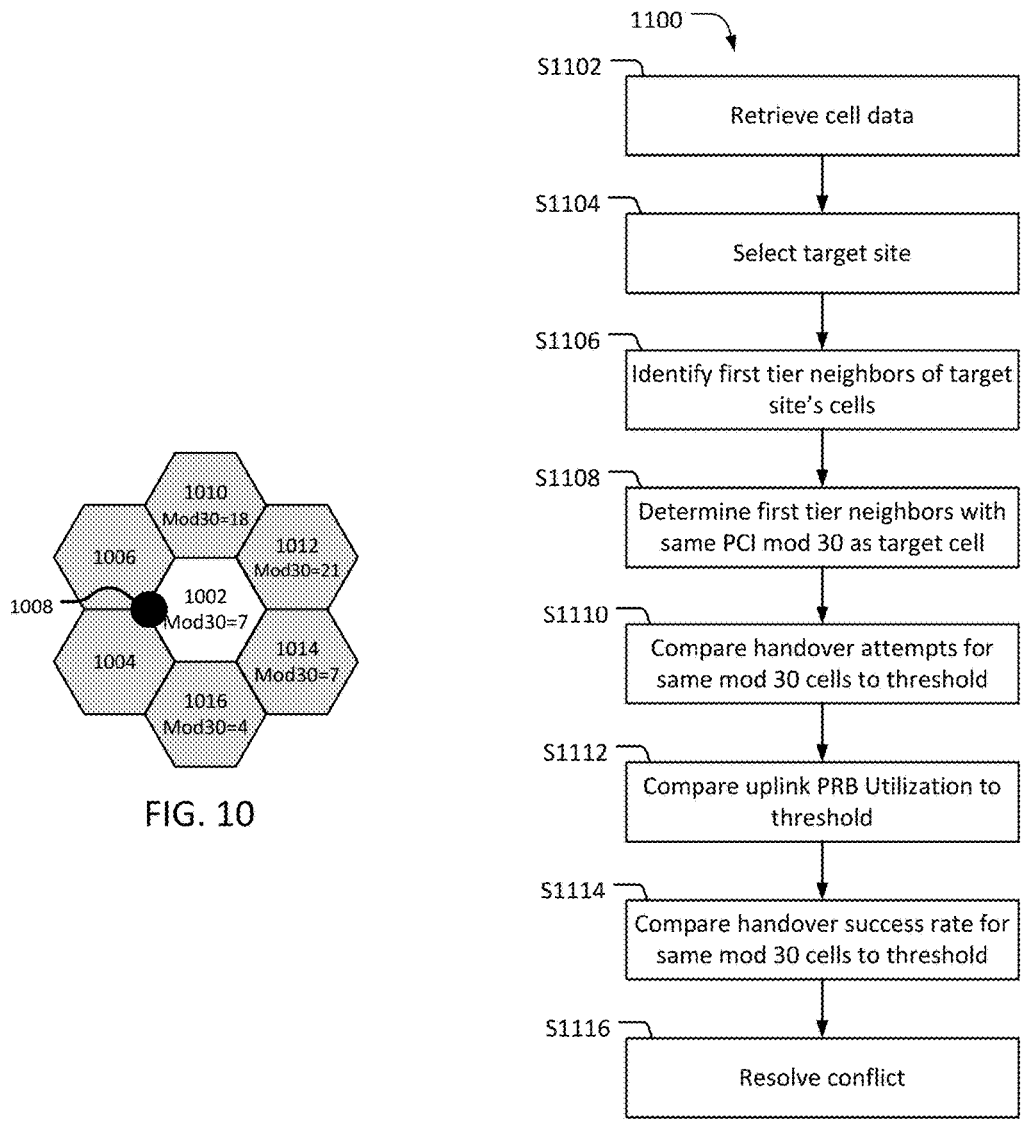
FIG. 10 illustrates a mod 30 conflict.
FIG. 11 illustrates an embodiment of a process for determining a problematic mod 30 conflict.

FIG. 10 shows an embodiment of a PCI mod 30 conflict in a wireless telecommunications network. In FIG. 10, cell 1002 has a PCI with a mod 30 of 7, which it shares with first tier neighbor 1014. For example, cell 1002 may have a PCI of 37, while neighbor cell 1014 may have a PCI of 97.

FIG. 11 shows a process 1100 for determining a problematic mod 30 conflict in a cellular network.

Cell data is retrieved at S1102. Retrieving cell data at S1102 may include retrieving configuration management data from a Configuration Management (CM) server and retrieving performance management data from a Performance Management (PM) server. PCI assignments may be included in the data from the CM server, Key Performance Indicators (KPI) such as handover metrics may be retrieved from the PM server, and channel quality indicator (CQI) data may be included in the PM data. Cell data may be retrieved for every target cell from the Operation Support System (OSS) for a network. The data retrieved at S1102 may include inbound and outbound handover data for each cell in a network.

Due to the limited number of sequences, mod 30 conflicts between first tier neighbors are common in cellular networks. Therefore, process 1100 performs operations to determine whether a particular mod 30 conflict is problematic.

A target site is selected at S1104. The site may be a base station site that serves one or more cells. In an embodiment, every site in a network may be selected at S1104, so that process 1100 is performed for all cells in the network. In other embodiments, process 1100 is performed on some portion of sites in the network. In another embodiment, process 1100 may be performed for some portion of cells of one or more site, such as cells that use a particular technology.

First tier neighbors for each cell of the site are identified at S1106. In an embodiment, a first tier neighbor is a mobility neighbor of a target cell and whose cell coverage area overlaps with or shares a cell boundary with a coverage area of the target cell. Neighbor tier relationships between cells are described, for example, in P.C.T. Application No. PCT/US15/52482. Neighbor tiers may be determined according to processes described in that document, by an RF planning tool, by a network engineer, etc.

First tier neighbors of the target cell with PCIs that have the same mod 30 value as the PCI of the target cell are determined at S1108. These neighbor cells may be determined by comparing PCI mod 30 values of each cell of the target cell to PCI mod 30 values of the first tier neighbors identified at S1106. If more than one of the first tier neighbors is found to have the same PCI mod 30 value, each of the conflicted neighbors may be separately analyzed as a conflict pair with the target cell 1002 by subsequent operations.

An amount of handover attempts between the target cell to the first tier neighbor cell involved in the PCI mod 30 conflict as the target cell is compared to a threshold value at S1110. A problematic PCI mod 30 conflict is expected to be associated with a higher number of handover attempts between conflicted cells. Therefore, if the number of attempts exceeds the threshold value, then the associated cells may be designated as being involved in a problematic conflict which is resolved by changing a PCI value for at least one of the conflicted cells.

Uplink Physical Resource Block (PRB) utilization is determined for the target cell and each first tier neighbor cell that shares the PCI mod 30 at S1112. The PRB utilization may be determined, for example, by calculating a percentage of PRBs that are used for uplink communications by both cells involved in the conflict. The PRB utilization may then be compared to a threshold value, and if the PRB utilization of both cells of a conflict pair are found to exceed the threshold value, then the conflict may be resolved. On the other hand, if the PRB utilization of either cell of the conflict pair is less than the threshold value, then the PCI conflict may be ignored.

A handover successes rate for handovers between the target cell and each first tier neighbor cell that shares the PCI mod 30 is determined at S1114 and compared to a threshold value.

If the threshold values for one or more of handover attempts, handover success rate and PRB utilization were both found to be exceeded at S1110 and S1112, and the level of handover successes is found to be less than the threshold value S1114, then the PCI mod 30 conflict is likely to be a problematic conflict, and it is resolved by changing at least one PCI value at S1116. In some embodiments, the conflict may be resolved at S1116 when only one or two of the criteria of S1110, S1112 and S1114 are met.

Figure 12:
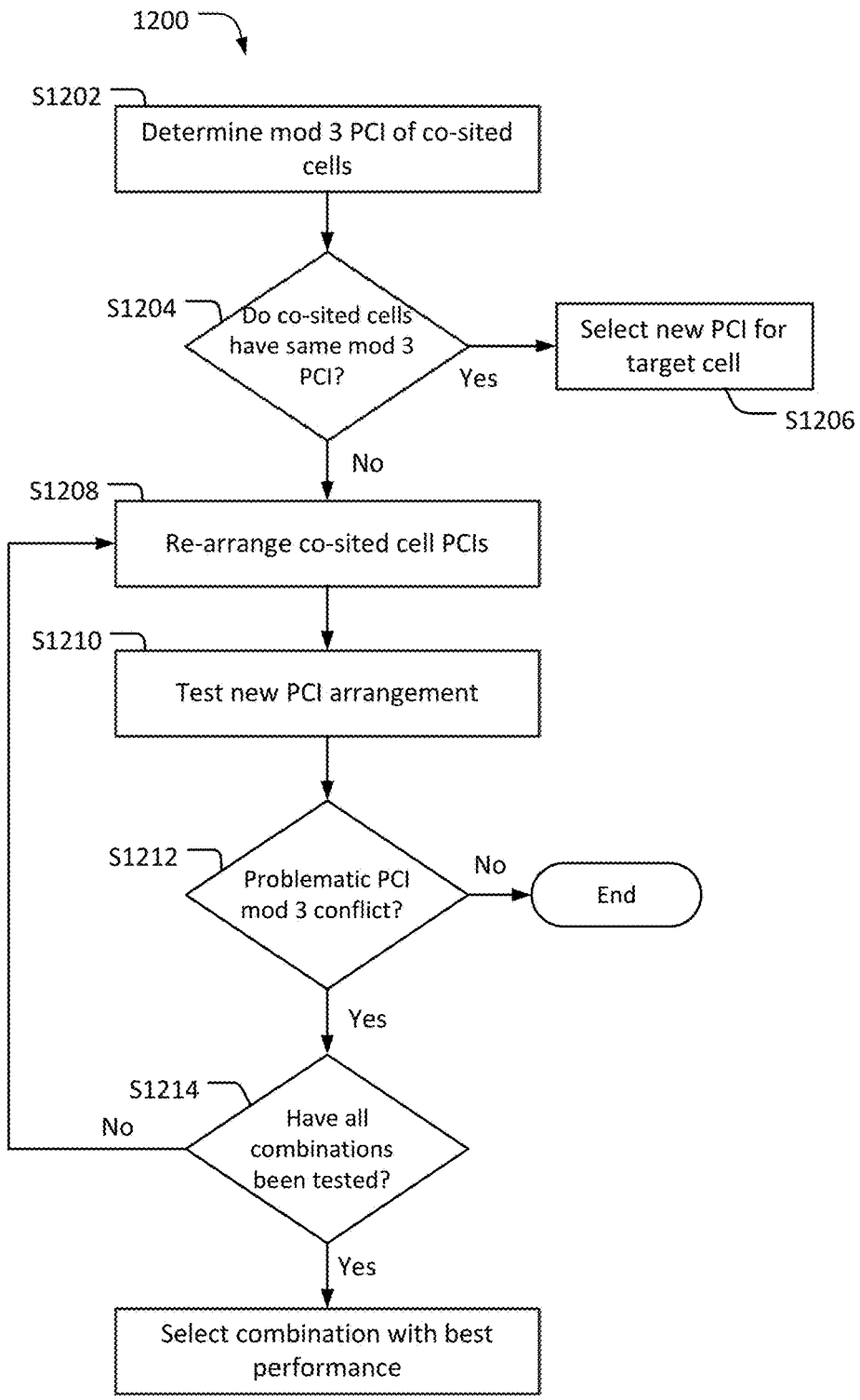
FIG. 12 illustrates an embodiment of a process for resolving a PCI mod conflict.

FIG. 12 shows a process 1200 for resolving a mod 3 conflict according to an embodiment. In an embodiment, process 1200 can be applied to resolve a mod 6 conflict.

The PCI mod 3s of co-sited cells are determined at S1202. In particular, S1202 determines PCI mod 3s of co-sited cells that use the same technology and frequency as the target cell. The mod 3 values of PCIs of the co-sited cells are compared to the PCI mod 3 of the target cell at S1204, and if they are found to be the same, or if re-arrangement of PCIs between co-sited cells is not allowed, then a new PCI value is selected for the target cell at S1206. In an embodiment, a new PCI is selected for the target cell when it is determined that any one of the co-sited cells has the same PCI mod 3 as the target cell.

When the PCI mod 3 of the target cell is different from the PCI values of the co-sited cells, the PCI values of the cells are changed by re-arranging the PCI values of the co-sited cells at S1208. Re-arranging the PCI values of the co-sited cells may include exchanging the existing PCI values between the co-sited cells.

There are six possible combinations of how PCI values can be allocated between cells at a three sector site. One combination is already in place when process 1200 is performed. PCI values of the co-sited are therefore re-arranged according to one of the remaining combinations is at S1208. One of the remaining combinations exchanges the PCI values of the co-sited cells, and maintains the same PCI value for the target cell. In an embodiment, this combination is avoided, and only combinations that change the PCI of the target cell are made at S1208.

The re-arranged PCI values may be tested at S1210. Testing the new PCI arrangement may include gathering performance data for a predetermined time period, and evaluating each of the co-sited cells according to process 900 at S1212. If performance is found to be acceptable, for example by determining that the cells do not cause a problematic PCI mod 3 conflict, or by determining that none of the co-sited cells are involved with problematic PCI mod 3 conflicts, then the problematic conflict is considered to be resolved and the process terminates.

If problematic PCI mod 3 conflicts are found to still be present for the target cell, or in an embodiment, for any of the co-sited cells, then process 1200 determines whether all possible combinations of co-sited PCI values have been tested at S1214. If all combinations have not been tested, then the PCI values may be re-arranged according to one of the untested combinations at S1208.

If all combinations are found to have been tested at S1214, then the combination with the best performance may be selected at S1214. In an embodiment, the combination with the best performance is the combination that is associated with the lowest number and/or percentage of handover attempts between conflicted cells.

Figure 13:
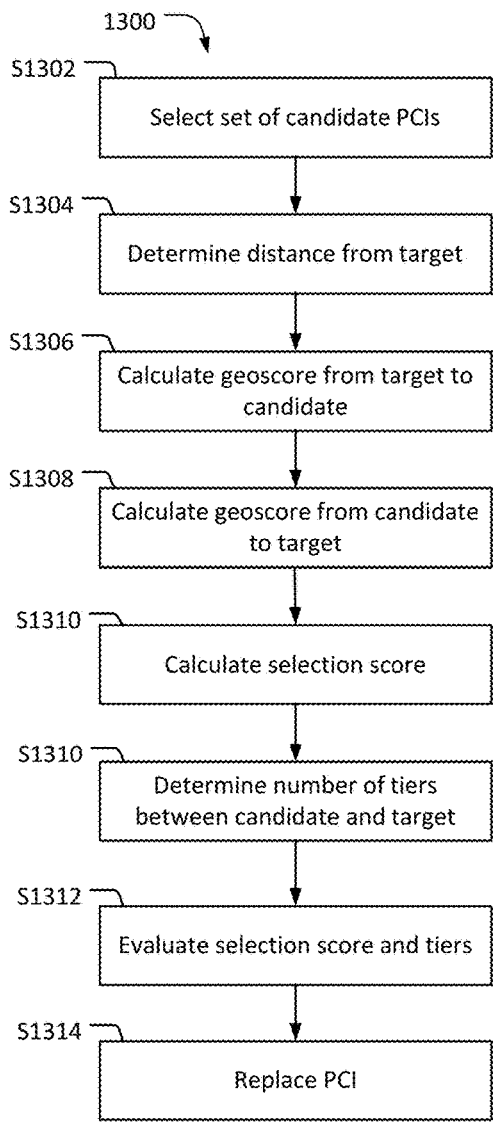
FIG. 13 illustrates an embodiment of a process for replacing a PCI value.

FIG. 13 shows an embodiment of a process 1300 of selecting a new PCI value for a target cell. Process 1300 may be performed, for example, at S1206 of process 1200, or at S1114 of process 1100.

A set of candidate PCI values that may be used to replace the PCI value of a target cell are selected at S1302. Selecting the set of candidate PCI values may be performed by selecting a set of all 504 possible PCI values, and then removing values from that set. For example, some networks reserve certain PCI values for use in testing, planning, and new cell deployment. These PCI values may be removed from a set of all possible PCI values to determine the set of candidate PCI values.

In addition to reserved PCI values, the PCI values that may be removed include: 1) PCI values that are used by first tier neighbors of the target cell, 2) PCI values that appear on a neighbor list of the target cell, 3) PCI values that are inbound neighbors of the target cell, 4) PCI values that have the same mod 3, mod 6 or mod 30 value of the target cell, and 5) PCI values that are blacklisted for the target cell by the network.

Locations of cells that use each of the candidate PCIs are used at S1304 to determine distances from the target cell to the nearest cell using the candidate PCI. In addition, geoscores are calculated from the perspective of the target cell to one or more cell that uses each candidate PCI at S1306. In an embodiment, geoscoring is only performed for cells that are within a predetermined distance from the target cell, or one or more cells that have PCI values with the furthest distances to the target cell.

Figure 14:
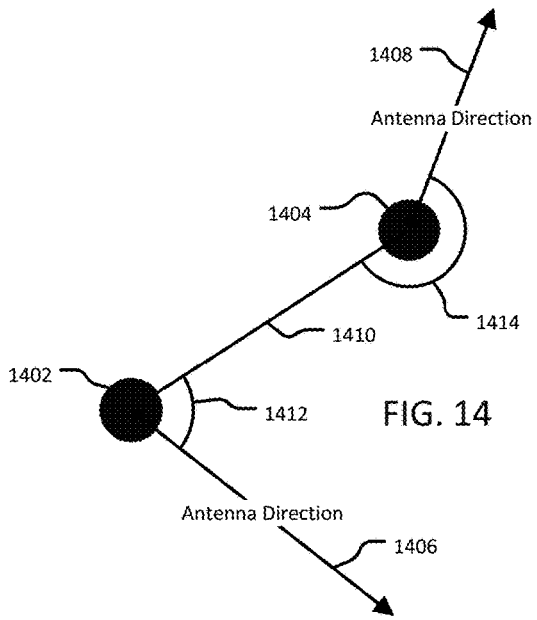
FIG. 14 illustrates an embodiment of a process for replacing a PCI value.

FIG. 14 shows an embodiment of determining a geoscore between two cells. In FIG. 14, a first cell 1402 and a second cell 1404 each have antennas that point in antenna directions 1406 and 1408, respectively. Line 1410 connects first cell 1402 to second cell 1404. In an embodiment, a geoscore between first cell 1402 and second cell 1404 is the cosine of angle 1410 between the azimuth 1406 of first cell 1402 and the line 1410 between the first and second cells. Thus, the geoscore for first cell 1412 effectively represents the extent to which the antenna of the first cell points towards the second cell 1414.

Similarly, a second geoscore from the second cell 1414 to the first cell 1402 may be determined at S1308 by calculating a cosine of the angle 1414 between the azimuth of second cell 1404 and a vector 1410 from the second cell to the fist cell.

A selection score may be calculated based on the geoscores and distance from S1304, S1306 and S1308. The selection score may be calculated according to the following Equation 1:

$$\text{selection score} = d - e^*(\text{geo1} + \text{geo2}) \quad \text{[Equation 1]}$$

In Equation 1, d is the distance between cells, geo1 is the geoscore from 1306, geo2 is the geoscore from 1308, and e is a scaling coefficient. Therefore, Equation 1 considers the distance between a target cell and a candidate cell, and the extent to which antennas of those cells point towards one another. However, Equation 1 is provided to illustrate a specific embodiment, and other embodiments are possible. The value of coefficient e may vary between embodiments to adjust the weight of the geoscoring element of Equation 1.

A number of tiers between the target cell and cells that use each candidate PCI are determined at S1310. In an embodiment, the tier relationships may be determined by counting tiers using techniques described in PCT Application No. PCT/US15/52482, Method and System for Neighbor Tier Determination. In another embodiment, tiers may be determined manually.

The selection score and tier count between the target cell and cells that use the candidate PCI values are evaluated at S1312 to determine a replacement PCI. In an embodiment, the replacement PCI is the PCI that belongs to a cell that is located at least a minimum distance from the target cell, and is separated by at least a minimum number of tiers from the target cell. The replacement PCI may be a cell that satisfies the minimum distance and tier count criteria, and is separated from the target cell by the largest distance or number of tiers, or has a combination of selection score and tier count separation that is greater than that of other candidate PCIs.

In an embodiment, a PCI change is recommended to a central network entity, and the central network entity pushes the identifier change to the network. Changing the identifier may include changing identifier values in memories of multiple network elements including base stations, user equipment, and various hardware elements that maintain neighbor information. Changing the identifier may include transmitting a signal from a central network entity over a wireline connection of a backhaul portion of a network to a base station. The base station may update neighbor list information in accordance with the signal, and wirelessly transmit the updated neighbor list to user equipment in the network. The user equipment may then store the new neighbor list information. The updated neighbor list information may be used to execute handover operations to the newly updated cell.

Optimizations described by this disclosure may be performed on demand or periodically. Various elements of the processes may be performed several times consecutively to optimize identifiers in a network. Because updating neighbor lists will affect the number of collisions present across a network, analyzing each cell in the network only one time for collisions may cause additional collisions. Analyzing the cells and updating identifiers a second time may result in additional improvements. However, the impact of changing identifiers decreases for consecutive iterations. Therefore, in an embodiment, an optimization process may be performed a limited number of times or until improvements are no longer substantial.

Embodiments of the present disclosure are improvements to conventional telecommunications technology. The inventors have discovered that network performance is substantially improved when implementing embodiments illustrated by this disclosure and as presented in the following claims.

What is claimed is:

1. A method for a cellular telecommunications network, the method comprising:
   performing a modulo operation on a physical cell identifier (PCI) of a target cell to determine a first PCI mod value;
   determining first tier neighbors of the target cell;
   determining that at least one of the first tier neighbors uses a PCI that has a PCI mod value that is the same as the first PCI mod value;
   comparing a number of handover attempts between the target cell and the at least one first tier neighbor with the first PCI mod value to a first threshold value; and
   when the number of handover attempts exceeds the threshold value, replacing the PCI of the target cell with a PCI with a second PCI mod value different from the first PCI mod value.

2. The method of claim 1, wherein the modulo operation is a modulo 3 operation or a modulo 6 operation.

3. The method of claim 2, further comprising:
   comparing a percentage of handover attempts between the target cell and the at least one first tier neighbor with the first PCI mod value to a second threshold value,
   wherein the PCI of the target cell is only replaced when the percentage of handovers exceeds the second threshold value.

4. The method of claim 2, wherein replacing the PCI of the target cell is performed by re-arranging the PCI of the target cell and PCI values for co-sited neighbor cells that use the same technology.

5. The method of claim 2, further comprising:
   comparing the first PCI mod value to PCI mod values of the co-sited neighbor cells; and
   wherein, when the first PCI mod value is different from the PCI mod values of the co-sited neighbor cells, replacing the PCI of the target cell by re-arranging the PCI of the target cell and the PCI values for co-sited neighbor cells that use the same technology.

6. The method of claim 4, further comprising:
   testing the re-arranged PCI values by gathering handover data from the cells with the re-arranged PCI values for a predetermined time; and analyzing the handover data to determine whether a problematic PCI conflict is present.

7. The method of claim 6, further comprising:
re-arranging the PCI values of the co-sited cells into a new combination when a problematic PCI conflict is determined to be present.

8. The method of claim 6, wherein the PCI values of the co-sited cells are re-arranged until a combination is found that is not associated with a problematic conflict, and if no combination is found that is not associated with a problematic conflict, the PCI of the target cell is replaced with a PCI that is not used by any of the co-sited cells.

9. The method of claim 1, wherein the modulo operation is a modulo 30 operation.

10. The method of claim 9, comparing a level of physical resource block (PRB) usage of the target cell to a third threshold value,
wherein the PCI of the target cell is only replaced when the percentage of PRB usage exceeds the third threshold value.

11. A network resource controller in a wireless telecommunications network, the controller comprising:
a memory;
a processor; and
a computer readable medium with executable instructions stored thereon which, when executed by the processor, perform the following operations:
determining first tier neighbors of the target cell;
determining that at least one of the first tier neighbors uses a PCI that has a PCI mod value that is the same as the first PCI mod value;
comparing a number of handover attempts between the target cell and the at least one first tier neighbor with the first PCI mod value to a first threshold value; and
when the number of handover attempts exceeds the threshold value, replacing the PCI of the target cell with a PCI with a second PCI mod value different from the first PCI mod value.

12. The method of claim 11, wherein the modulo operation is a modulo 3 operation or a modulo 6 operation.

13. The network resource controller of claim 12, wherein the operations further comprise:
comparing a percentage of handover attempts between the target cell and the at least one first tier neighbor with the first PCI mod value to a second threshold value,
wherein the PCI of the target cell is only replaced when the percentage of handovers exceeds the second threshold value.

14. The network resource controller of claim 12, wherein replacing the PCI of the target cell is performed by re-arranging the PCI of the target cell and PCI values for co-sited neighbor cells that use the same technology.

15. The network resource controller of claim 12, wherein the operations further comprise:
comparing the first PCI mod value to PCI mod values of the co-sited neighbor cells; and
wherein, when the first PCI mod value is different from the PCI mod values of the co-sited neighbor cells, replacing the PCI of the target cell by re-arranging the PCI of the target cell and the PCI values for co-sited neighbor cells that use the same technology.

16. The network resource controller of claim 14, wherein the operations further comprise:
testing the re-arranged PCI values by gathering handover data from the cells with the re-arranged PCI values for a predetermined time; and
analyzing the handover data to determine whether a problematic PCI conflict is present.

17. The network resource controller of claim 16, wherein, when a problematic PCI conflict is determined to be present, re-arranging the PCI values of the co-sited cells into a new combination.

18. The network resource controller of claim 16, wherein the PCI values of the co-sited cells are re-arranged until a combination is found that is not associated with a problematic conflict, and if no combination is found that is not associated with a problematic conflict, the PCI of the target cell is replaced with a PCI that is not used by any of the co-sited cells.

19. The network resource controller of claim 11, wherein the modulo operation is a modulo 30 operation.

20. The network resource controller of claim 19, wherein the operations further comprise:
comparing a level of physical resource block (PRB) usage of the target cell to a third threshold value,
wherein the PCI of the target cell is only replaced when the level of PRB usage exceeds the third threshold value.

* * * * *